US012617236B2

(12) United States Patent
Delfino et al.

(10) Patent No.: US 12,617,236 B2
(45) Date of Patent: May 5, 2026

(54) DEFORMABLE WHEEL WITH NON-PNEUMATIC LOAD BEARING FOR LUNAR AND MARTIAN CONDITIONS

(71) Applicant: VENTURI LAB SA, Corminboeuf (CH)

(72) Inventors: Antonio Delfino, Corminboeuf (CH); David F. Olsommer, Corminboeuf (CH)

(73) Assignee: VENTURI LAB SA, Corminboeuf (CH)

( * ) Notice: Subject to any disclaimer, the term of this patent is extended or adjusted under 35 U.S.C. 154(b) by 323 days.

(21) Appl. No.: 18/457,720

(22) Filed: Aug. 29, 2023

(65) Prior Publication Data

US 2024/0066923 A1 Feb. 29, 2024

(30) Foreign Application Priority Data

Aug. 29, 2022 (EP) .................................... 22192685

(51) Int. Cl.
*B60C 7/14* (2006.01)
*B60B 9/04* (2006.01)
(Continued)

(52) U.S. Cl.
CPC ............... *B60C 7/146* (2021.08); *B60B 9/04* (2013.01); *B60B 9/26* (2013.01); *B60B 27/00* (2013.01);
(Continued)

(58) Field of Classification Search
CPC .. B60B 9/04; B60B 9/26; B60C 7/146; B60C 7/06; B60C 7/107; B60C 7/24
See application file for complete search history.

(56) References Cited

U.S. PATENT DOCUMENTS 3,493,027 A * 2/1970 Dewhirst .................. B60C 7/14
152/11
6,170,544 B1 * 1/2001 Hottebart .................. B60B 9/26
152/5
(Continued)

FOREIGN PATENT DOCUMENTS

CN 109720148 B 7/2020
FR 3090498 A3 6/2020
(Continued)

OTHER PUBLICATIONS

Extended European Search Report from corresponding EP Application No. 22192685.0, Jan. 2, 2023.

*Primary Examiner* — Kip T Kotter
(74) *Attorney, Agent, or Firm* — Workman Nydegger

(57) ABSTRACT

A deformable wheel with non-pneumatic load bearing intended to equip a vehicle for rolling under extreme conditions such as those encountered on the moon and on Mars, includes a hub, a laminated annular strip including a plurality of concentric ferrules which are assembled with the interposition of interposing layers each composed of a material whose Young's modulus is 600,000 to 1,000 times lower than that of the ferrules, and a plurality of metal cables. Each cable connects the hub to the laminated strip while being fixed, on the one hand by an external end to the laminated strip, and on the other hand by an internal end to the hub by means of an elastic member making it possible to modulate the radial stiffness of the cables. Each elastic member is associated with an abutment able to limit its deformation.

17 Claims, 10 Drawing Sheets

(51) Int. Cl.

| | |
|---|---|
| *B60B 9/26* | (2006.01) |
| *B60B 27/00* | (2006.01) |
| *B60C 7/06* | (2006.01) |
| *B60C 7/10* | (2006.01) |
| *B60C 7/24* | (2006.01) |

(52) U.S. Cl.
CPC ................ *B60C 7/06* (2013.01); *B60C 7/107* (2021.08); *B60C 7/24* (2013.01); *B60B 2360/102* (2013.01); *B60B 2900/721* (2013.01)

(56) References Cited

U.S. PATENT DOCUMENTS

| | | | |
|---|---|---|---|
| 7,418,988 | B2 | 9/2008 | Cron et al. |
| 11,267,287 | B2 | 3/2022 | Delfino et al. |
| 2003/0226630 | A1* | 12/2003 | Delfino ..................... B60C 7/12 152/246 |
| 2011/0272254 | A1* | 11/2011 | Anderfaas ................. B60B 9/26 492/15 |
| 2013/0233458 | A1* | 9/2013 | Meraldi .................... B60B 9/26 152/5 |
| 2016/0096400 | A1 | 4/2016 | Nomura et al. |
| 2017/0057287 | A1* | 3/2017 | Martin ...................... B60B 9/26 |
| 2018/0029422 | A1* | 2/2018 | Thompson ............ B60C 9/1807 |
| 2019/0217665 | A1 | 7/2019 | Delfino et al. |
| 2021/0070106 | A1 | 3/2021 | Merino Lopez et al. |
| 2022/0080775 | A1 | 3/2022 | Limozin et al. |

FOREIGN PATENT DOCUMENTS

| | | |
|---|---|---|
| JP | H082204 A | 1/1996 |
| WO | 2018060578 A1 | 4/2018 |

* cited by examiner

DEFORMABLE WHEEL WITH NON-PNEUMATIC LOAD BEARING FOR LUNAR AND MARTIAN CONDITIONS

BACKGROUND OF THE INVENTION

The present invention relates to a deformable wheel with non-pneumatic load bearing. More particularly, the invention relates to a wheel which bears a load with its structural components and which has performance capacities suitable for equipping a vehicle intended to roll under extreme conditions such as those encountered on the Moon and on Mars.

The pneumatic wheel has load bearing, road shock absorption and force transmission (accelerations, stops and changes of direction) capabilities that are particularly well suitable for many vehicles in particular bicycles, motorcycles, cars and trucks. The shock absorption capabilities of tires are also useful in other applications, for example for trolleys transporting medical equipment or sensitive electronic equipment.

Alternatives to the pneumatic wheel exist. Mention may be made, for example, of solid tires and spring-loaded tires. However, these alternatives do not have the performance advantages of the pneumatic wheels. Particularly, the solid tires rely on the compression of the part in contact with the soil to bear the load. This type of tires can be heavy and rigid and does not have the capacity to absorb the shocks of the pneumatic wheels. When made more elastic, the conventional non-pneumatic wheels do not have the load bearing or the endurance of the pneumatic wheels.

To overcome these drawbacks, the publication U.S. Pat. No. 7,418,988 proposes a tire with structural bearing which comprises an external annular strip and a plurality of spokes extending transversely and radially inwards from the annular strip to the hub of the wheel and intended to transmit in tension the load forces between the annular strip and the hub.

The wheel with structural bearing according to this invention does not include a cavity intended to contain pressurized air and therefore does not need to have a seal with the rim of the wheel to maintain the internal air pressure. This wheel with structural bearing therefore does not require a tire in the usual sense.

The spokes of this wheel act in tension to transmit the load forces between the wheel and the annular strip, which makes it possible in particular to bear the mass of a vehicle. The bearing forces are generated by the tension of the spokes which are not connected to the part of the annular strip in contact with the soil. The spokes also transmit the forces required for the acceleration, the stops and the turns.

Whatever the alternatives known from the prior art for the production of non-pneumatic wheels, these generally do not give complete satisfaction, in particular when they are intended to roll under extreme conditions such as those encountered on the Moon and on Mars. Indeed, with such conditions, it is necessary for the wheel to be able to deform strongly when passing an obstacle while generating a contact pressure which is low and uniform to allow the vehicle to remain movable on loose soil such as soil found on the Moon and on Mars.

SUMMARY OF THE INVENTION

The main aim of the present invention is therefore to overcome such drawbacks by proposing a deformable wheel structure with non-pneumatic load bearing which can in particular equip vehicles intended to roll under extreme conditions such as those encountered on the moon and on Mars.

In accordance with the invention, this aim is achieved thanks to a deformable wheel with non-pneumatic load bearing intended to equip a vehicle for rolling under extreme conditions such as those encountered on the moon and on Mars, comprising:

a hub, a laminated annular strip intended to be in contact with the soil, positioned around the hub which is concentric therewith and comprising a plurality of concentric ferrules which are assembled with interposition of interposing layers each composed of a material whose Young's modulus is 600,000 to 1,000 times lower than that of the ferrules, and a plurality of metal cables whose outer diameter is comprised between 0.2 mm and 5 mm, each cable radially connecting the hub to the laminated strip while being fixed, on the one hand by an external end to the laminated strip, and on the other hand by an internal end to the hub by means of an elastic member making it possible to modulate the radial stiffness of the cables, each elastic member being associated with an abutment able to limit its deformation.

The wheel according to the invention is remarkable in particular due to the presence of the laminated annular strip which comprises a plurality of concentric ferrules which are assembled with interposition of interposing layers each composed of a material whose Young's modulus is 600,000 to 1,000 times lower than that of the ferrules, for example made of elastomer material. Under an externally applied load, the part of the laminated strip in contact with the soil deforms, not in an essentially circular shape, but in a shape conforming to the surface of the soil while maintaining an essentially constant length of the ferrules. The relative displacement of the ferrules of the laminated strip occurs by shearing in the interposing layers. The wheel according to the invention thus makes it possible to generate a contact pressure which is low and uniform on the soil. In this way, the vehicle equipped with such wheels can remain movable (that is to say it does not get stuck in the sand) even on loose soil (of the sand type) as found on the Moon and on Mars.

The wheel according to the invention is also remarkable for the use of metal cables radially connecting the hub to the laminated strip with a fixing to the hub by means of an elastic member making it possible to modulate the radial stiffness. Particularly, thanks to their intrinsic characteristics and to the presence of the elastic members, the metal cables have a low compressive rigidity and a high tensile rigidity, which allows the cables fixed to the laminated strip which are in contact with the soil to bend in order to absorb the shocks of the road and to perfectly conform the laminated strip to the irregularities of the surface of the road, in particular when passing an obstacle.

More generally, the wheel according to the invention thus constituted has the advantage of generating significant traction forces and without slipping, in particular when the vehicle equipped with such wheels takes a slope. Furthermore, the wheel according to the invention makes it possible to have a carried load to wheel mass ratio comprised between 15 and 25.

Preferably, the ferrules of the laminated strip are made of metal or of composite material.

Preferably also, the interposing layers are composed of a hyperelastic elastomer having a glass transition temperature below 120° C.

Advantageously, the cables have a ratio between their tensile mechanical stiffness and their compressive mechanical stiffness which is comprised between 50,000 and 300,000, and preferably between 25,000 and 150,000.

According to another advantageous disposition, each cable is inclined with respect to a plane radial to the hub by an angle alpha comprised between 0.1° and 45°—and preferably equal to 10°—and/or with respect to a plane transverse to the hub by an angle beta comprised between 0.1° and 45°—and preferably equal to 10°. This non-alignment of the cables with radial directions makes it possible to increase the rigidity of the wheel when it is stressed laterally (for example in a turn) or when the vehicle brakes.

The external end of the cables can be fixed on rods mounted against an external surface of the laminated strip.

According to one embodiment, the internal end of the cables is fixed to the hub by means of leaf springs making it possible to modulate their radial stiffness.

In this embodiment, the leaf springs can be fixed at the level of their respective center against an internal surface of the hub forming the abutment able to limit their deformation and extend longitudinally along a direction circumferential to the hub, each leaf spring comprising two opposite longitudinal ends which are each connected to the internal end of a cable.

In addition, still in this embodiment, the wheel can comprise a plurality of leaf springs which are fixed against the internal surface of the hub on the inner side of the wheel, and a plurality of leaf springs which are fixed against the internal surface of the hub on the outer side of the wheel.

Preferably, each leaf spring comprises a plurality of stainless steel leaves which are superimposed on each other.

Still in this embodiment, the hub can carry at least one disk protruding radially outwards and having an outer diameter against which the internal surface of the laminated strip is able to come into abutment in order to limit its deformations.

According to another embodiment, the internal end of the cables is fixed to the hub by means of U-bent leaves forming a spring making it possible to modulate the radial stiffness of the cables.

In this other embodiment, the U-bent leaves can be fixed at their respective free ends against an internal surface of the hub and extend longitudinally along an axial direction of the hub, each U-bent leaf being connected to the internal end of a cable.

Preferably, the wheel comprises a plurality of U-bent leaves which extend longitudinally on the inner side of the wheel, and a plurality of U-bent leaves which extend longitudinally on the outer side of the wheel.

Still in this other embodiment, the hub can carry at least one disk protruding radially outwards and having an inner diameter against which the U-bent leaves are able to come into abutment in order to limit their deformation, and a outer diameter against which the internal surface of the laminated strip is able to come into abutment in order to limit its deformations.

BRIEF DESCRIPTION OF THE DRAWINGS

Other characteristics and advantages of the present invention will become apparent from the description given below, with reference to the appended drawings which illustrate one exemplary embodiment devoid of any limitation. On the figures.

DETAILED DESCRIPTION OF EMBODIMENTS

Figure 1:
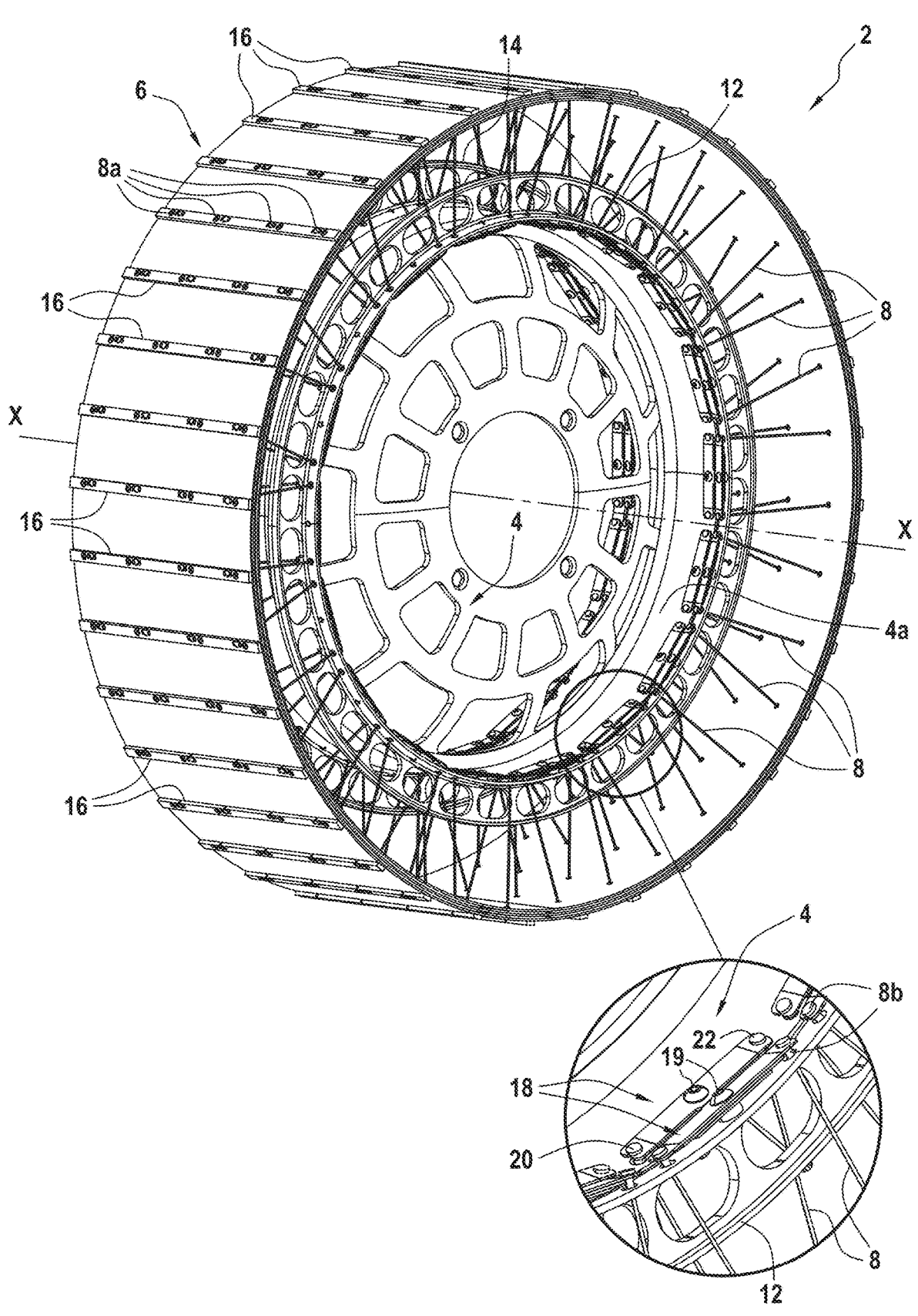
FIG. 1 is a schematic perspective view of a wheel according to a first embodiment of the invention.

The invention relates to a deformable wheel with non-pneumatic load bearing as represented in FIG. 1 which is adapted to equip a vehicle intended to roll under extreme conditions such as those encountered on the Moon and on Mars.

The wheel 2 represented in FIG. 1 mainly comprises a hub 4, a laminated annular strip 6 intended to be in contact with the soil, and a plurality of metal cables 8 radially connecting the hub to the laminated strip.

Figure 2:
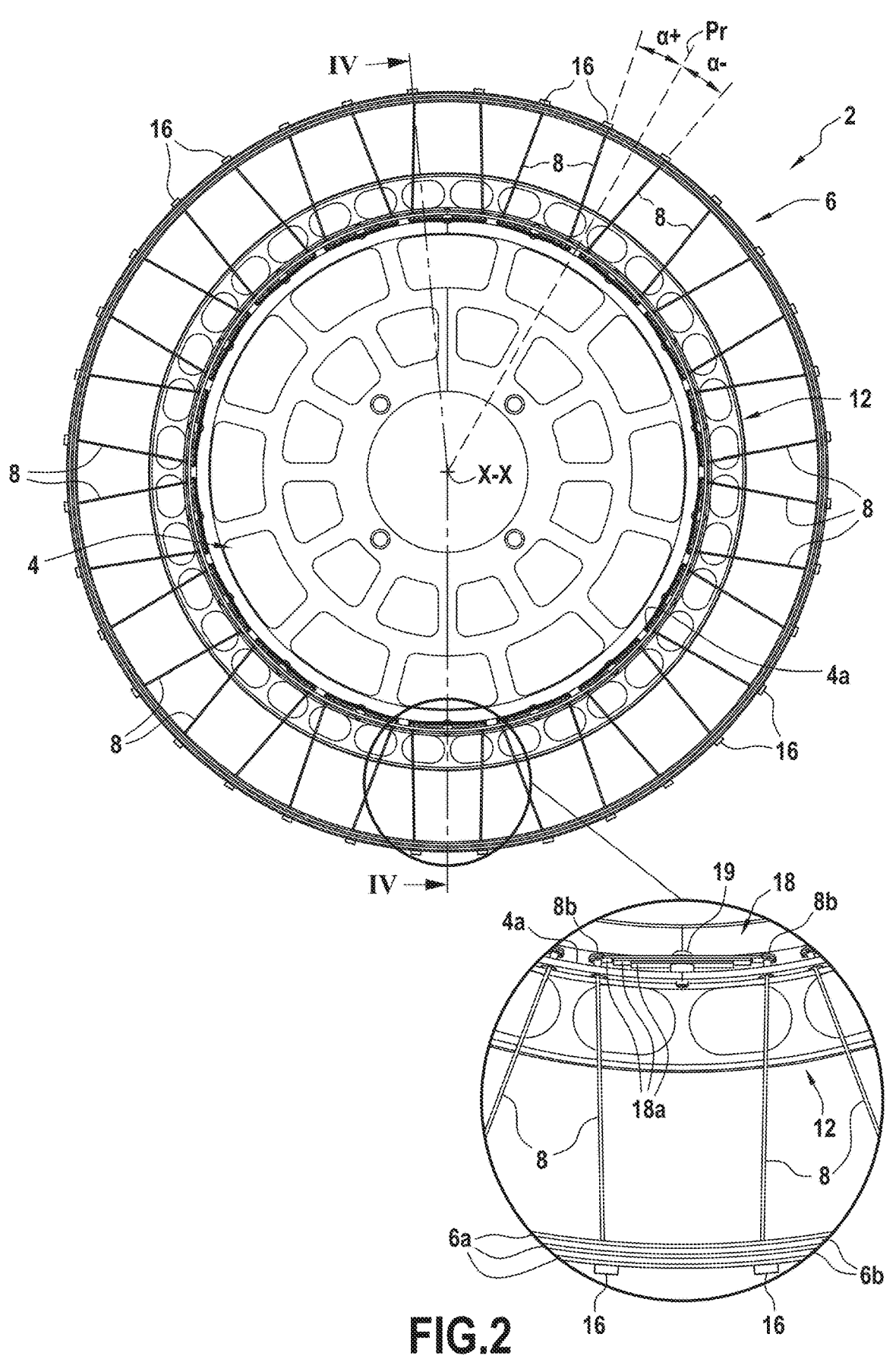
FIG. 2 is a schematic front view of the wheel of FIG. 1 in elevation.
Figure 4:
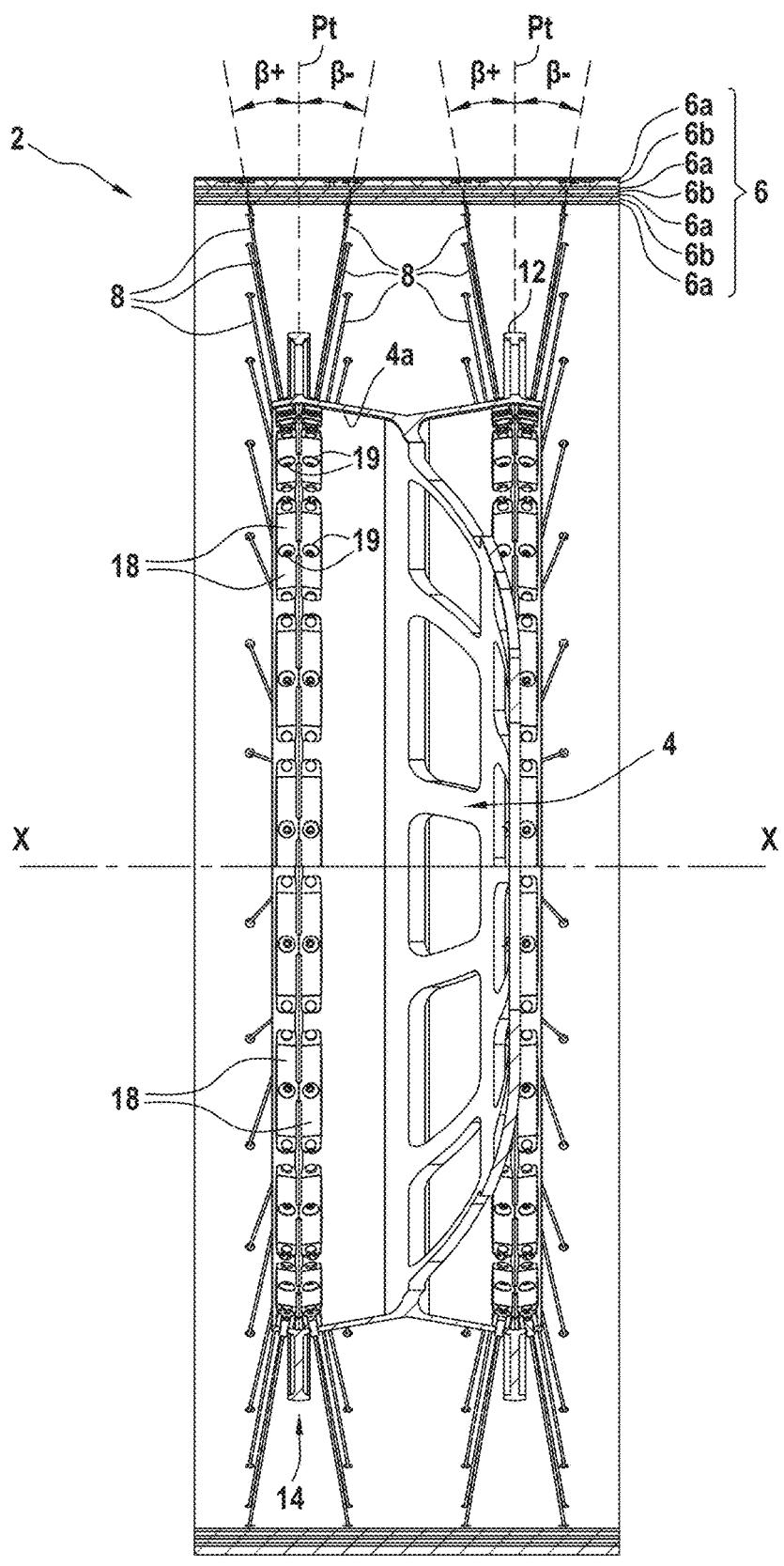
FIG. 4 is a sectional view along IV-IV of FIG. 2.
Figure 5:
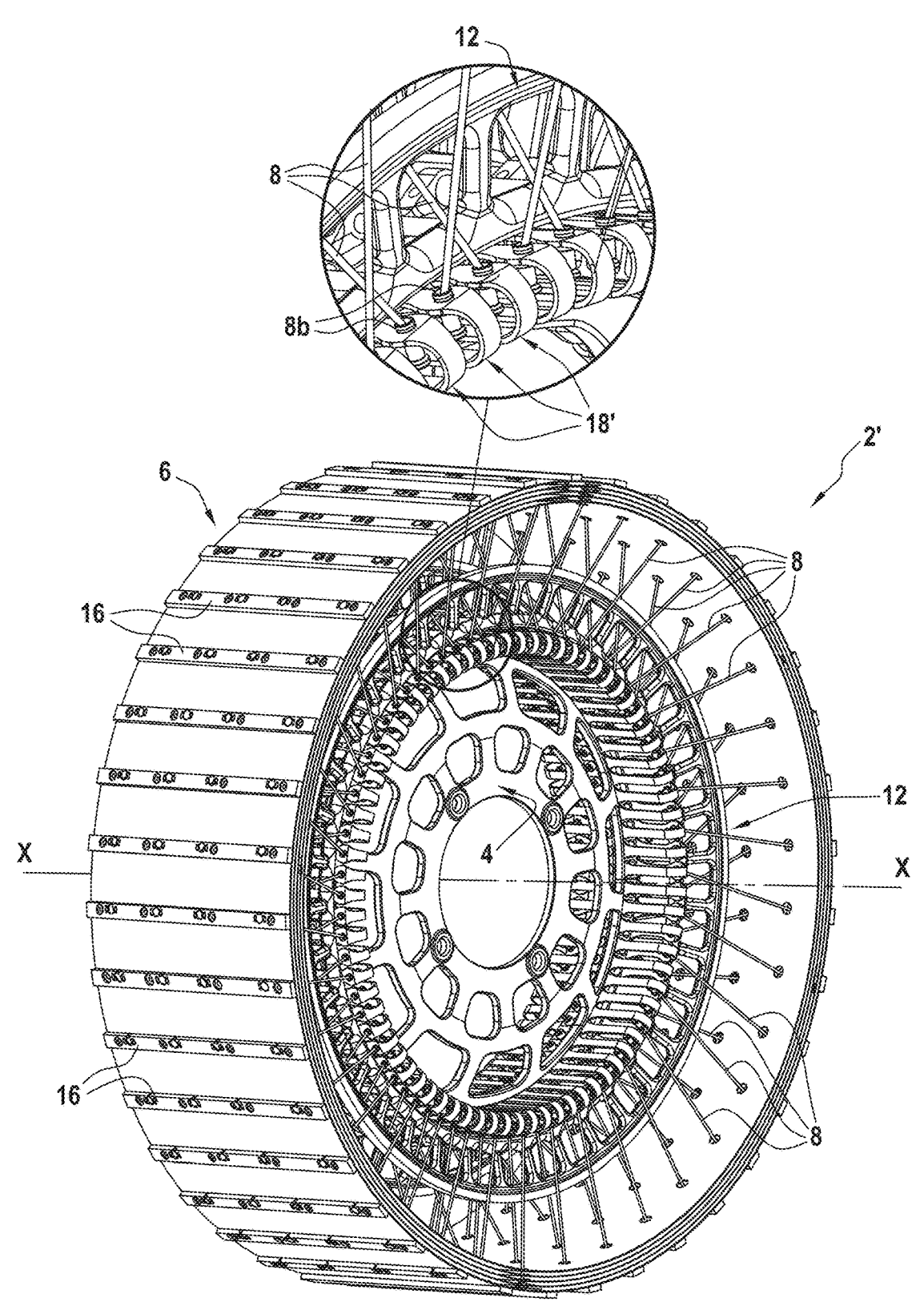
FIGS. 5 and 6 are schematic views from two different perspectives of a wheel according to a second embodiment of the invention.
Figure 6:
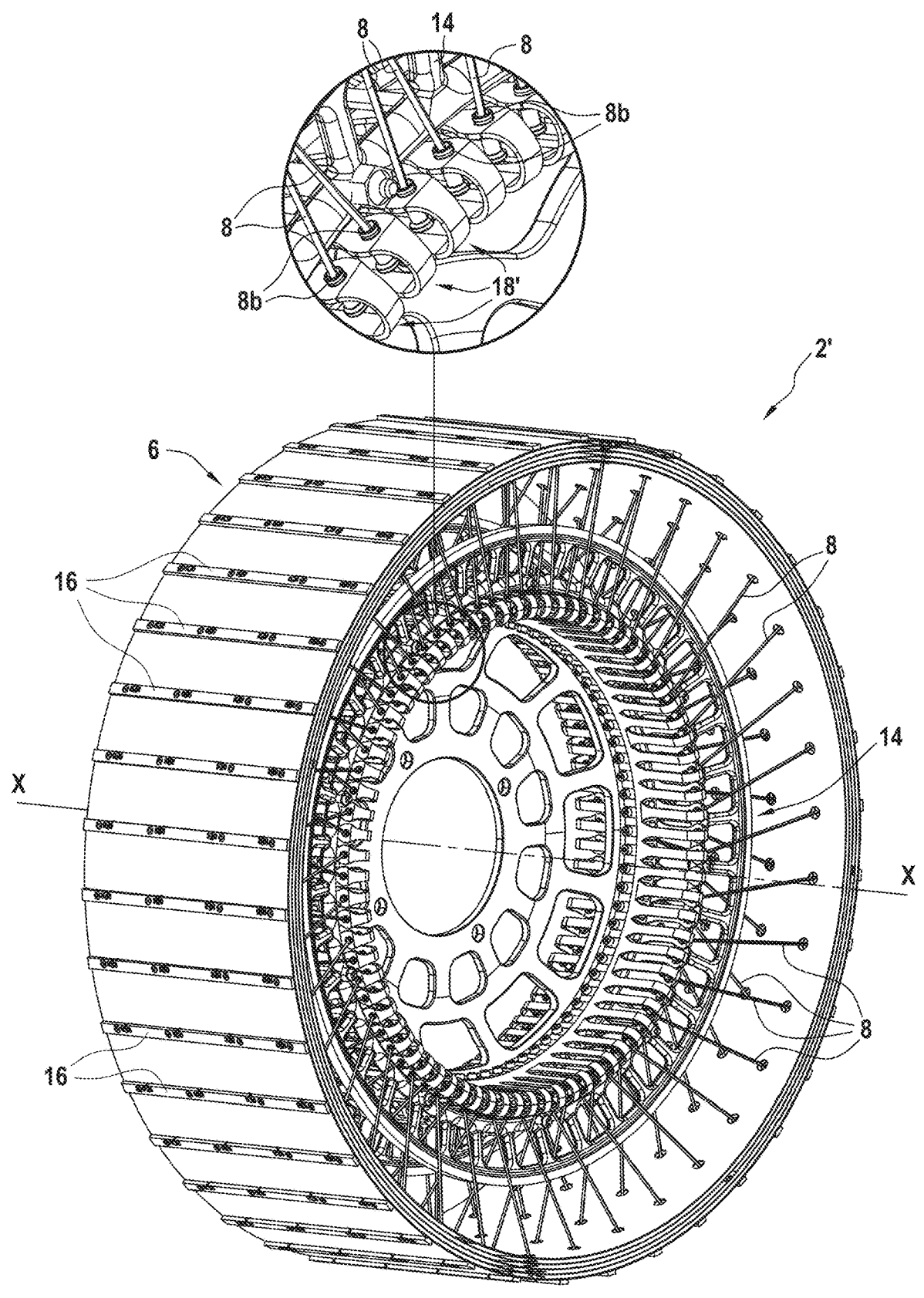

As represented in FIGS. 2 and 4, the laminated strip 6 consists of a plurality of concentric ferrules 6a which are assembled together by sandwiching interposing layers 6b each composed of a material whose Young's modulus is 600,000 to 1,000 times lower than that of the ferrules.

The ferrules 6a can be metallic (for example made of steel) or made of composite material.

As for the interposing layers 6b, they are advantageously made of a hyperelastic elastomer having a glass transition temperature below 120° C.

Thanks to such a composition of the laminated strip 6, the part of the laminated strip which is in contact with the soil deforms under an externally applied load but in a shape conforming to the surface of the soil while maintaining an essentially constant length of the ferrules 6a which compose it. The relative displacement of the ferrules of the laminated strip occurs by shearing in the interposing layers 6b.

As represented in particular in FIG. 1, the hub 4 of the wheel carries two disks 12, 14 which protrude radially outwards. These two disks 12, 14 are spaced from each other along the axis X-X of the wheel and each have an outer diameter against which the internal surface of the laminated strip 6 is able to come into abutment in order to limit its deformations.

The cables 8 radially connect the laminated strip 6 to the hub 4. For this purpose, each cable 8 comprises an external end 8a which is fixed on rods 16 themselves mounted against an external surface of the laminated strip.

In this configuration, the external ends 8a of the cables pass through all of the ferrules 6a and interposing layers 6b of the laminated strip. Of course, it is possible to envisage that the external ends 8a of the cables are fixed on the internal surface of the laminated strip.

At their respective internal end, the cables 8 are fixed on the hub 4 by means of an elastic member 18 making it possible to modulate the radial stiffness of the cables. Here again, the internal ends 8b of the cables pass through the hub in its thickness.

Each cable 8 is composed of an assembly of metal wires (for example made of steel) made up of strands, themselves brought together around a metal core. For example, each cable includes 6 or 7 strands each composed of 7 to 61 metal wires, the assembly having an outer diameter comprised between 0.2 mm and 5 mm.

In addition, each cable 8 has a ratio between its tensile mechanical stiffness Kt and its compressive mechanical stiffness Kc which is comprised between 50,000 and 300, 000 (i.e. 5,000≤Kt/Kc≤300,000), and preferably comprised between 25,000 and 150,000 (i.e. 25,000≤Kt/Kc≤150,000).

These mechanical stiffness values Kt and Kc were obtained by following the recommendations of the ISO 2408:2017 and ISO 17893:2004 standards (relating to the requirements of steel cables) and by using an INSTRON® brand testing machine, model 34TM-10.

In other words, the cables 8 have a stiffness asymmetry with a tensile mechanical stiffness Kt greatly greater than their compressive mechanical stiffness Kc.

Moreover, in the first embodiment of FIGS. 1 to 4, the cables 8 have a particular distribution all around the axis X-X of the wheel with a first double row of n cables whose respective internal ends are positioned on the inner side of the wheel, and a second double row of m cables whose respective internal ends are positioned on the outer side of the wheel.

More specifically, for each double row of cables, the internal ends are mounted on the hub by being positioned laterally between one of the two disks 12, 14 and the (inner and outer) side edge of the hub. The number n, m of cables can be the same for each double row of cables.

In addition, as represented in FIG. 2, each cable 8 is advantageously inclined with respect to a plane Pr radial to the hub 4 by an angle α comprised (in absolute value) between 0.1° and 45°, and preferably equal to 10° (in absolute value).

Particularly, for the same row of cables, it may be advantageous to provide for an alternation of the inclinations between adjacent cables (one of the cables would have a positive angle of inclination α—denoted "α+" in FIG. 2—and the adjacent cable would have a negative angle of inclination α—denoted "α−" in FIG. 2).

Similarly, as represented in FIG. 4, each cable 8 is advantageously inclined with respect to a plane Pt transverse to the hub 4 by an angle β comprised between 0.1° and 45° (in absolute value), and preferably equal to 10° (in absolute value).

Particularly, for each of the two double rows of cables, it may be advantageous to provide that all the cables belonging to one of the two rows have a positive angle of inclination β (denoted "β+" in FIG. 4) and all the cables belonging to the other of the two rows have a negative angle of inclination β (denoted "β−" in FIG. 4).

These inclinations α, β of the cables 8 make it possible to increase the rigidity of the wheel when it is stressed laterally (for example in a turn) or when the vehicle equipped with such a wheel brakes.

In the first embodiment of FIGS. 1 to 4, the elastic members by means of which the respective internal end 8b of the cables 8 is fixed on the hub 4 are leaf springs 18. These leaf springs 18 make it possible to modulate the radial stiffness of the cables.

More specifically, each leaf spring 18 has the shape of an elongated plate which extends longitudinally along a direction circumferential to the hub 4 and which is fixed at its center by a rivet 19 against an internal surface 4a of the hub.

In addition, each leaf spring 18 comprises two opposite longitudinal ends 20, 22 which are each connected to the internal end 8b of a cable 8. Thus, in this embodiment, two adjacent cables share the same elastic member 18 making it possible to modulate their radial stiffness.

Given the particular distribution of the cables 8 in two rows spaced from each other along the longitudinal axis X-X of the wheel, n/2 leaf springs which are fixed against the internal surface 4a of the hub on the inner side of the wheel are therefore provided, and m/2 leaf springs which are fixed against the internal surface of the hub on the outer side of the wheel are provided.

Figure 3:
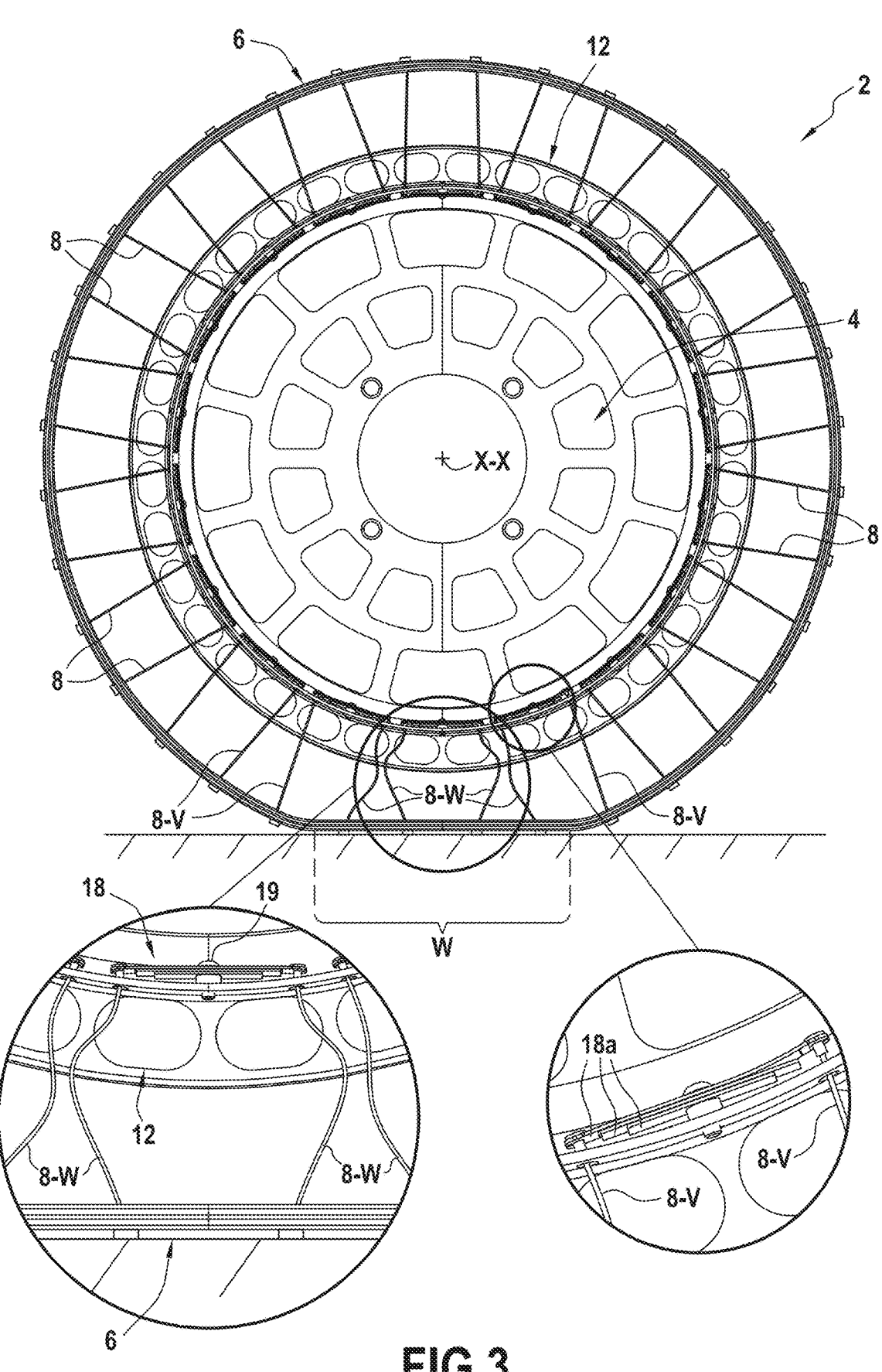
FIG. 3 is a schematic front view of the wheel of FIG. 1 resting on the soil and subjected to a load.

Moreover, as represented in FIGS. 2 and 3, the leaf springs 18 of this first embodiment each consist of a superposition of a plurality (for example 3 in number) of metal leaves 18a, for example made of steel. The superposition of leaves has the advantage of allowing significant displacement (deflection) without reaching the elastic limit of each of the leaves. In other words, it is possible to size the bending stiffness to reach the desired value without plasticizing the elementary leaves.

It will be noted that, in this first embodiment, the internal surface 4a of the hub 4 forms an abutment able to limit the outward deformation of the spring-loaded leaves 18.

As represented in FIG. 3, the particular structure of the wheel according to the invention allows the part W of the laminated strip 6 which comes into contact with the soil to deform when the wheel 2 is subjected to a load, not under an essentially circular shape, but in a shape conforming to the surface of the soil. Particularly, the structure of the laminated strip makes it possible to be able to generate a uniform contact pressure on the soil.

The cables 8-W which are located angularly at the level of the part W of the laminated strip 6 which is in contact with the soil compress and wear down easily because of their weak compressive mechanical stiffness Kc.

The cables 8-V which are located angularly just upstream and just downstream of the part W of the laminated strip 6 which is in contact with the soil also undergo a strong traction which is taken up by the leaf springs 18 on which their respective external end 8a is fixed (the spring-loaded leaves associated with these cables 8-V deform towards the outside of the hub).

When the surface of the soil presents a major obstacle (for example a rock), the part W of the laminated strip 6 which is in contact with the soil continues to deform to match the profile of the obstacle. In such a situation, depending on the size of the obstacle, the internal surface of the laminated strip 6 can come into abutment against the external diameter of the disks 12, 14 carried by the hub 4 in order to limit the deformations undergone by the laminated strip.

In relation to FIGS. 5 to 9, a wheel 2' according to a second embodiment will now be described.

This second embodiment differs from the previous one by the elastic members by means of which the respective internal end 8b of the cables 8 is fixed on the hub 4.

In this embodiment, these elastic members are in the form of U-bent leaves 18' (that is to say at 180°) forming springs making it possible to modulate the radial stiffness of the cables.

The leaves 18' are made of metal, for example steel or composite material. They have a bending stiffness which is comprised between 200 N/mm and 1 N/mm, and preferably between 70 N/mm and 5 N/mm (these bending stiffness values were obtained by means of an "INSTRON®" brand testing machine, model 34TM-10).

More specifically, the U-bent leaves 18' are fixed at the level of their respective free ends against the internal surface 4a of the hub 4 by means of a screw/nut system 24 (see FIG.

9) and extend longitudinally along an axial direction of the hub (that is to say along the longitudinal axis X-X of the wheel).

Furthermore, each U-bent leaf 18' is connected, at the level of its end opposite to its free ends, to the internal end of one of the cables 8. Thus, unlike the previous embodiment, there are provided as much U-bent leaves 18' that there are metal cables.

In one variant of embodiment not represented, the U-bent leaves are grouped together in groups of several leaves (between 2 and 10 for example, and preferably 4 in number) which are connected together in the central part of the wheel so as to guarantee a good alignment of the leaves with each other (and thus avoid a rotation of the leaves around their fixing point on the wheel).

Given the particular distribution of the cables 8 in two rows spaced from each other along the longitudinal axis X-X of the wheel 2', n U-bent leaves 18' which are fixed against the internal surface 4a of the hub on the inner side of the wheel are provided, and m U-bent leaves 18' which are fixed against the internal surface of the hub on the outer side of the wheel are provided.

The U-bent leaves which are fixed on the inner side of the wheel extend longitudinally (that is to say parallel to the longitudinal axis X-X of the wheel) towards the inside of the wheel, and the U-bent leaves which are fixed on the outer side of the wheel extend longitudinally towards the outside of the wheel.

Moreover, as for the previous embodiment, the cables 8 have a particular distribution all around the axis X-X of the wheel 2' with a first double row of n cables whose respective internal ends 8b are fixed to the U-bent leaves positioned on the inner side of the wheel, and a second double row of m cables whose respective internal ends are fixed to the U-bent leaves positioned on the outer side of the wheel.

Figure 7:
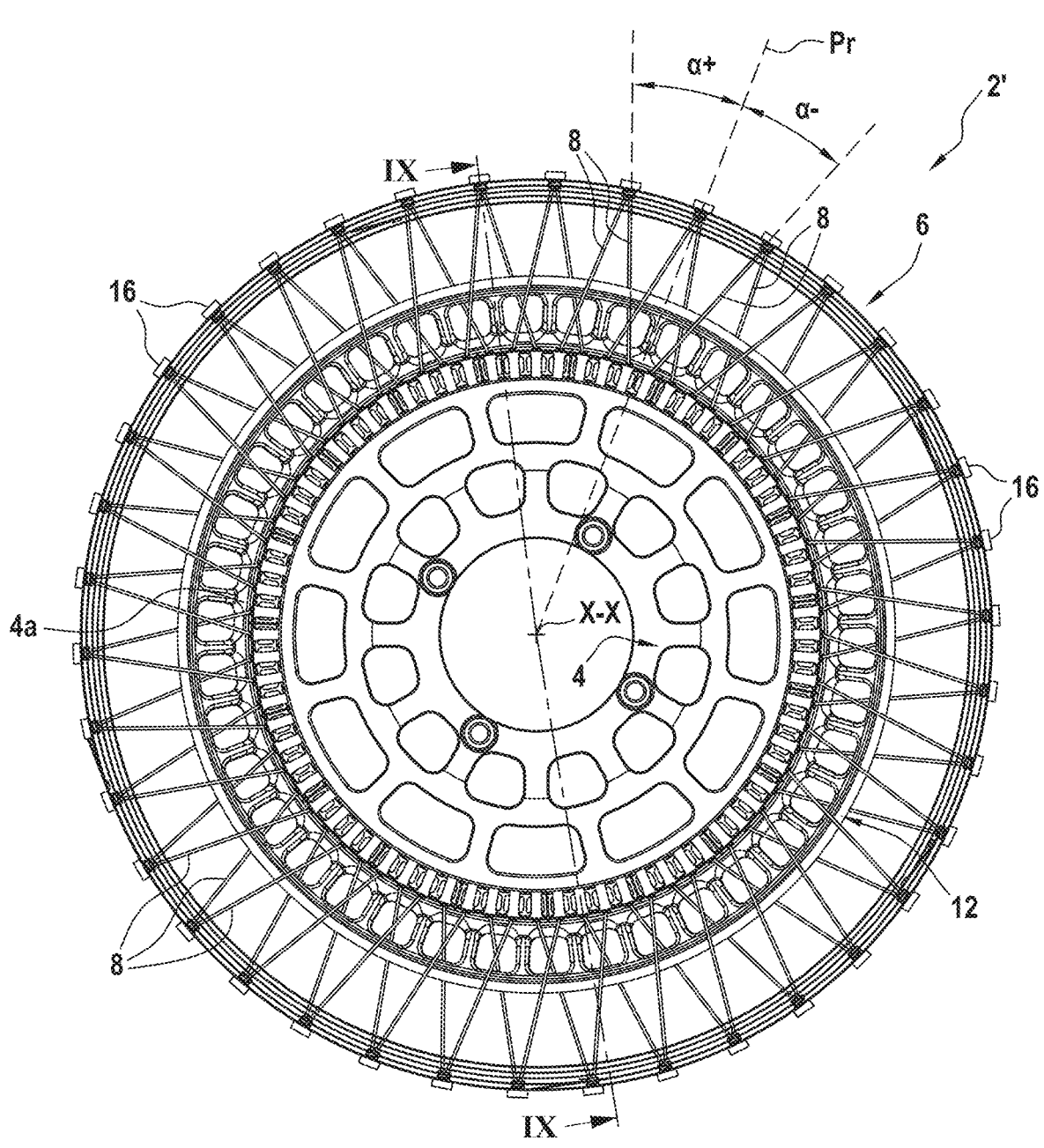
FIG. 7 is a schematic front view of the wheel of FIGS. 5 and 6 in elevation.
Figure 9:
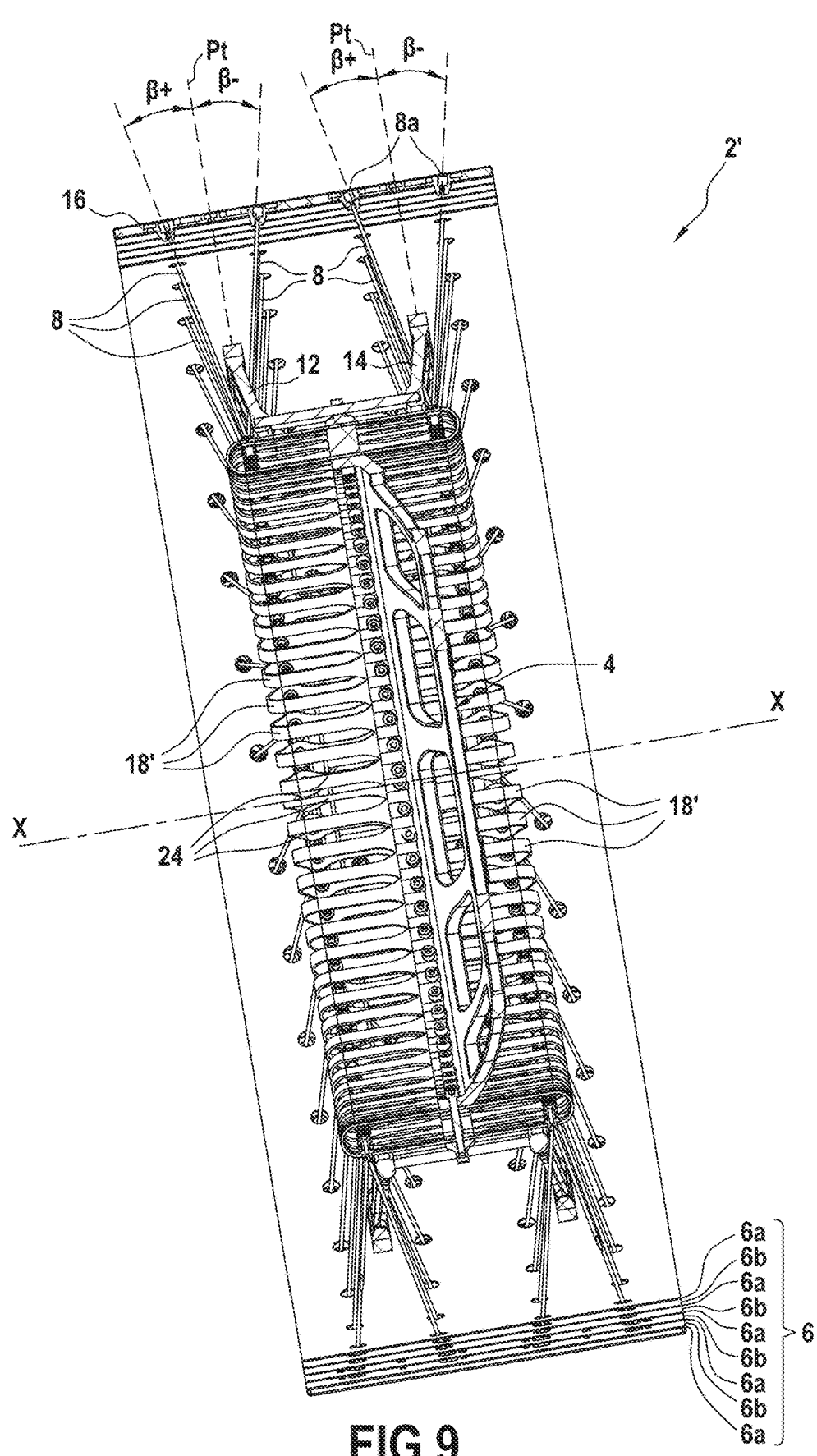
FIG. 9 is a sectional view along IX-IX of FIG. 7.

Similarly, in this second embodiment, as represented in FIGS. 7 and 9, each cable 8 is advantageously inclined with respect to a plane Pr radial to the hub by an angle α comprised between 0.1° and 45° (in absolute value) and/or with respect to a plane Pt transverse to the hub by an angle β comprised between 0.1° and 45° (in absolute value).

For each of the two double rows of cables, it is advantageous to provide that all the cables belonging to the same row have an angle of inclination α with respect to a radial plane which is positive (denoted "α+" in FIG. 7), and that all the cables belonging to the other row present an angle of inclination α with respect to a radial plane which is negative (denoted "α−" in FIG. 7).

Similarly, for each of the two double rows of cables, it may be advantageous to provide that all the cables belonging to one of the two rows have an angle of inclination β with respect to a transverse plane which is positive (denoted "β+" in FIG. 9) and all the cables belonging to the other of the two rows have an angle of inclination β with respect to a transverse plane which is negative (denoted "β−" in FIG. 9).

In this second embodiment, the hub 4 also carries two disks 12, 14 protruding radially outwards. Each of these two disks has an inner diameter against which the U-bent leaves 18' are able to come into abutment in order to limit their deformation.

Similarly, as for the first embodiment, each of the two disks 12, 14 has an outer diameter against which the internal surface of the laminated strip 6 is able to come into abutment in order to limit the deformations thereof.

Figure 8:
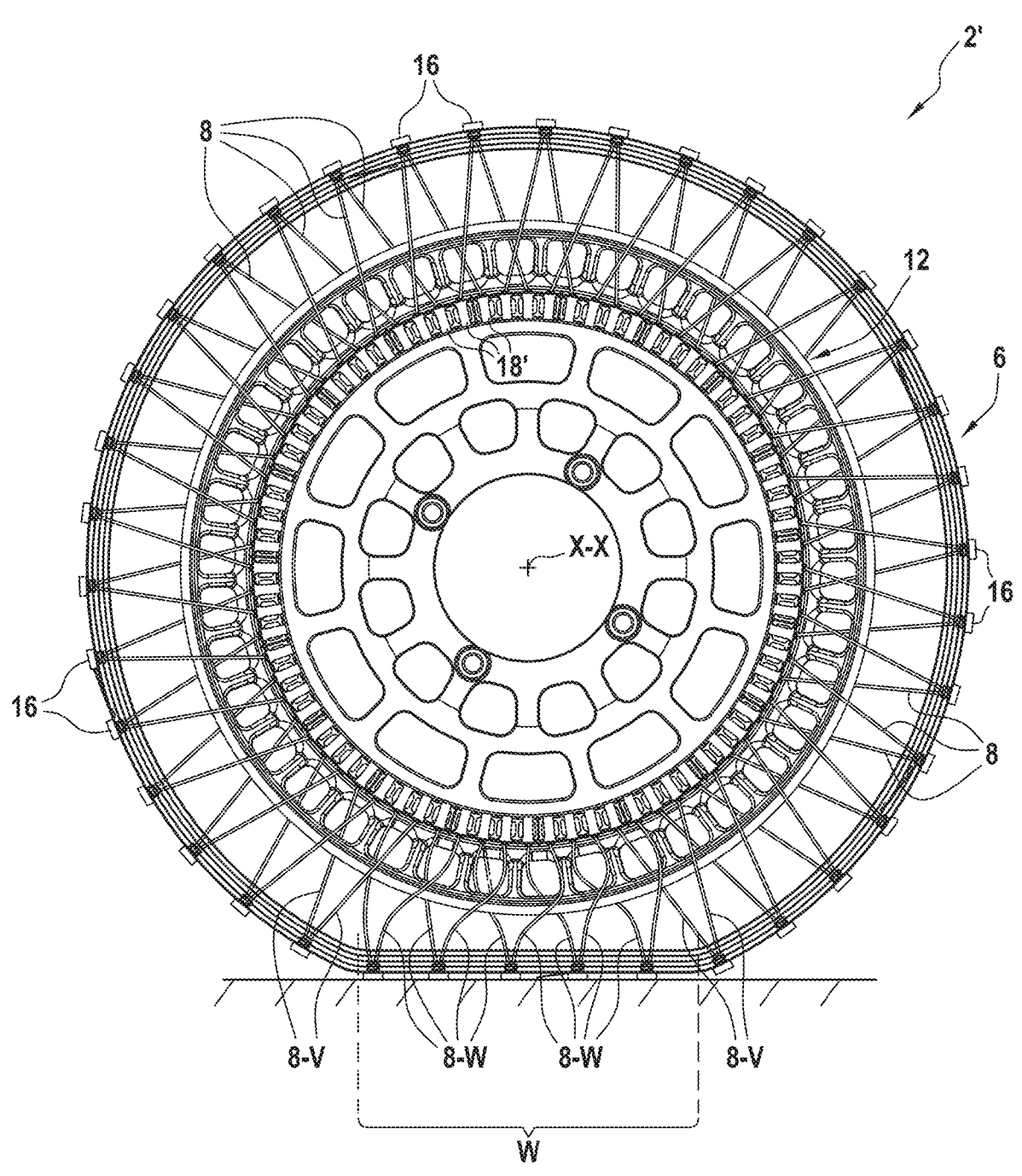
FIG. 8 is a schematic front view of the wheel of FIGS. 5 and 6 resting on the soil and subjected to a load.

It will also be noted that the mechanical behavior of the particular structure of this wheel 2' according to this second embodiment is identical to the one relating to the first embodiment. Particularly, as represented in FIG. 8, when the wheel 2' is subjected to a load, the particular structure of the wheel according to the invention allows the part W of the laminated strip 6 which comes into contact with the soil to deform, not in an essentially circular shape, but in a shape conforming to the surface of the soil.

The cables 8-W which are located angularly at the level of the part W of the laminated strip 6 which is in contact with the soil compress and wear down easily due to their weak compressive mechanical stiffness Kc.

As for the cables 8-V which are located angularly just upstream and just downstream of the part W of the laminated strip 6 which is in contact with the soil, undergo a strong traction which is taken up by the U-bent leaves 18' on which their respective outer end 8a is fixed (the spring-loaded leaves associated with these cables 8-V deform towards the outside of the hub).

Figure 10:
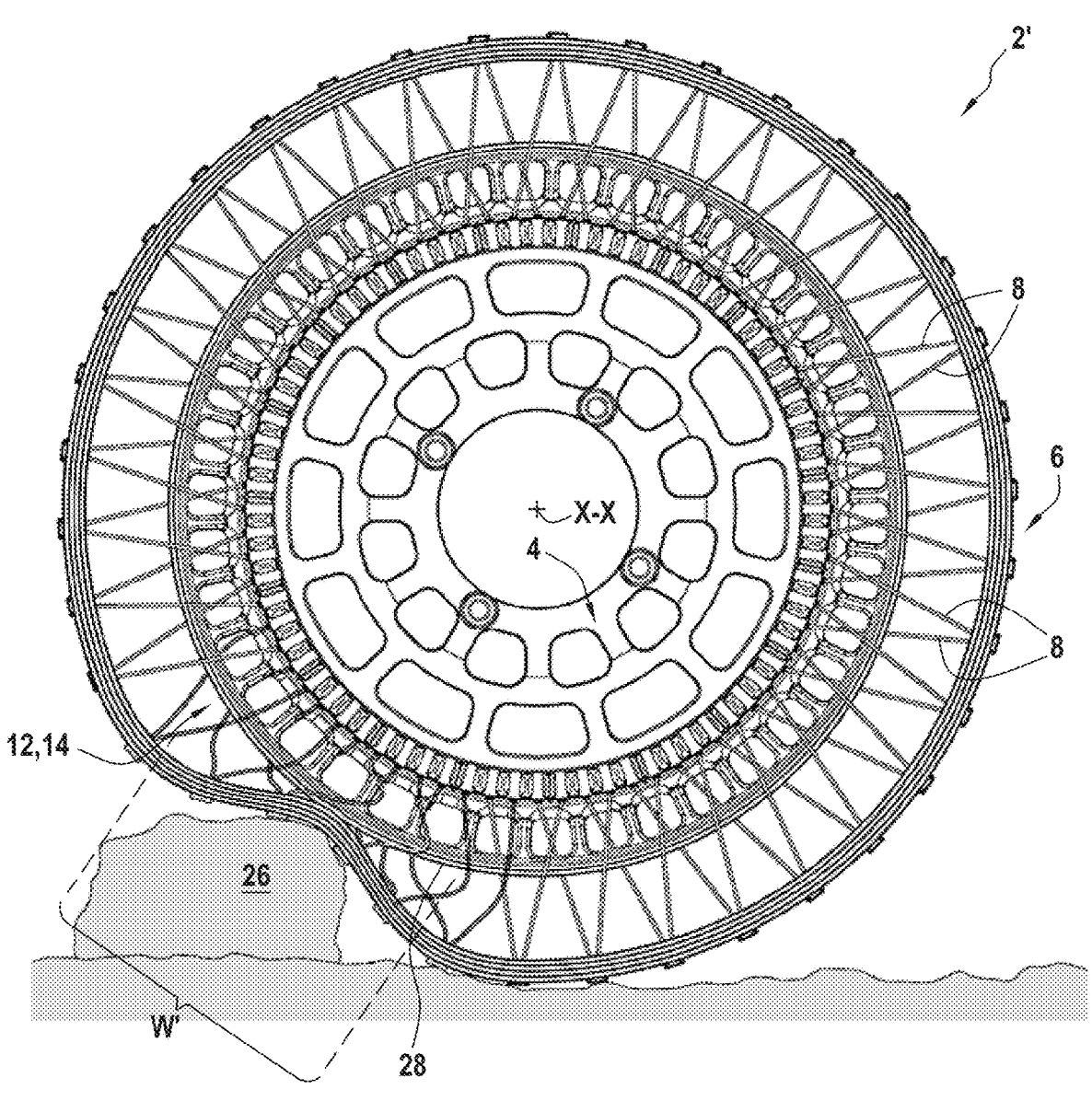
FIG. 10 is a schematic front view of the wheel of FIGS. 5 and 6 when passing a large obstacle.

Furthermore, as represented in FIG. 10, when the surface of the soil presents a major obstacle (for example a rock 26), the part W' of the laminated strip 6 of the wheel 2' which rolls over the obstacle continues to deform in order to match the profile of the obstacle.

In such a situation, depending on the size of the obstacle, the internal surface of the laminated strip 6 can come into abutment against the outer diameter of the disks 12, 14 carried by the hub 4 in order to limit the deformations undergone by the laminated strip.

In addition, in order to soften the contact of the laminated strip with the disks 12, 14, it may be advantageous for their outer diameter to be provided with a strip of softening laminate 28 (for example metal/elastomer).

The invention claimed is:

1. A deformable wheel with non-pneumatic load bearing intended to equip a vehicle for rolling under extreme conditions, the wheel comprising:
   a hub,
   a laminated annular strip configured to be in contact with soil, positioned around the hub which is concentric therewith and comprising a plurality of concentric ferrules which are assembled with interposition of interposing layers each composed of a material whose Young's modulus is 600,000 to 1,000 times lower than that of the ferrules, and
   a plurality of metal cables having an outer diameter between 0.2 mm and 5 mm, each cable radially connecting the hub to the laminated strip while being fixed by an external end to the laminated strip and by an internal end to the hub by means of an elastic member to modulate radial stiffness of the cables, each elastic member being associated with an abutment configured to limit deformation.

2. The wheel according to claim 1, wherein the ferrules of the laminated strip are made of metal or of composite material.

3. The wheel according to claim 1, wherein the interposing layers of the laminated strip are composed of a hyperelastic elastomer having a glass transition temperature below 120° C.

4. The wheel according to claim 1, wherein the cables have a ratio between tensile mechanical stiffness (Kt) and compressive mechanical stiffness (Kc) between 25,000 and 300,000.

5. The wheel according to claim 4, wherein the ratio between the tensile mechanical stiffness (Kt) and the compressive mechanical stiffness (Kc) of the cables is between 25,000 and 150,000.

6. The wheel according to claim 1, wherein each cable is inclined with respect to a plane (Pr) radial to the hub by an angle (α) comprised between 0.1° and 45° and/or with respect to a plane transverse to the hub (Pt) by an angle (β) comprised between 0.1° and 45°.

7. The wheel according to claim 6, wherein each cable is inclined with respect to a plane (Pr) radial to the hub by an angle (α) of 10° and/or with respect to a plane (Pt) transverse to the hub by an angle (β) of 10°.

8. The wheel according to claim 1, wherein the external end of the cables is fixed on rods mounted against an external surface of the laminated strip.

9. The wheel according to claim 1, wherein the elastic member includes a plurality of leaf springs, and wherein the internal end of the cables is fixed to the hub by the plurality of leaf springs to modulate radial stiffness.

10. The wheel according to claim 9, wherein the leaf springs of the plurality of leaf springs are fixed at a level against an internal surface of the hub forming the abutment configured to limit deformation and extend longitudinally along a direction circumferential to the hub, each leaf spring of the plurality of leaf springs comprising two opposite longitudinal ends which are each connected to the internal end of a cable.

11. The wheel according to claim 10, wherein at least part of the plurality of leaf springs are fixed against the internal surface of the hub on an inner side of the wheel, and wherein at least part of plurality of leaf springs are fixed against the internal surface of the hub on an outer side of the wheel.

12. The wheel according to claim 9, wherein each leaf spring comprises a plurality of stainless steel leaves which are superimposed on each other.

13. The wheel according to claim 9, wherein the hub carries at least one disk protruding radially outwards and having an outer diameter against which an internal surface of the laminated strip is configured to come into abutment in order to limit deformation.

14. The wheel according to claim 1, wherein the internal end of the cables is fixed to the hub by U-bent leaves of the elastic member forming a spring to modulate the radial stiffness of the cables.

15. The wheel according to claim 14, wherein the U-bent leaves are fixed at respective free ends against an internal surface of the hub and extend longitudinally along an axial direction of the hub, each U-bent leaf being connected to the internal end of a cable.

16. The wheel according to claim 15, wherein at least part of the U-bent leaves extend longitudinally on an inner side of the wheel, and wherein at least part of the U-bent leaves extend longitudinally on an outer side of the wheel.

17. The wheel according to claim 14, wherein the hub carries at least one disk protruding radially outwards and having an inner diameter against which the U-bent leaves are configured to come into abutment in order to limit deformation, and an outer diameter against which an inner surface of the laminated strip is configured to come into abutment in order to limit deformation.

\*    \*    \*    \*    \*